United States Patent [19]
Evers

[11] Patent Number: 5,999,116
[45] Date of Patent: Dec. 7, 1999

[54] METHOD AND APPARATUS FOR IMPROVING THE SURVEILLANCE COVERAGE AND TARGET IDENTIFICATION IN A RADAR BASED SURVEILLANCE SYSTEM

[75] Inventor: Carl A. Evers, Rockville, Md.

[73] Assignee: Rannoch Corporation, Alexandria, Va.

[21] Appl. No.: 09/114,921

[22] Filed: Jul. 14, 1998

[51] Int. Cl.[6] ................................................. G01S 13/06
[52] U.S. Cl. .......................... 342/36; 342/463; 342/29; 342/31
[58] Field of Search .................. 342/29, 31, 32, 342/33, 36, 37, 59, 450, 451, 453, 456, 463, 465

[56] References Cited

U.S. PATENT DOCUMENTS

| 4,688,046 | 8/1987 | Schwab ................................. 342/456 |
| 5,262,784 | 11/1993 | Drobnicki et al. ........................ 342/45 |
| 5,374,932 | 12/1994 | Wyschogrod et al. ..................... 342/36 |
| 5,596,326 | 1/1997 | Fitts ........................................... 342/30 |
| 5,867,804 | 2/1999 | Pilley et al. .............................. 701/120 |

FOREIGN PATENT DOCUMENTS

| 40-6342061 | 12/1994 | Japan ................. G01S 13/06 |
| 40-8146130 | 6/1996 | Japan ................. G01S 13/93 |
| 40-9119983 | 5/1997 | Japan ................. G01S 13/93 |
| 09288175 | 11/1997 | Japan ................. G01S 7/292 |

*Primary Examiner*—John B. Sotomayor
*Attorney, Agent, or Firm*—Greenberg Traurig; Robert P. Bell

[57] ABSTRACT

The surveillance system provides a means to measure Time Difference of Arrival (TDOA) and decode identification of signal source transmissions. TDOA and identification information received from a minimum of two receiving means is used to supplement non-cooperative surveillance systems (e.g., primary radar, acoustic sensors) with target identification. The system uses a Line Of Position technique to determine position. The system can be implemented as a standalone multilateration surveillance system, which provides signal source position determination when reception is available from a minimum of two receiving means. The system provides position aiding when implemented to supplement non-cooperative surveillance systems.

3 Claims, 4 Drawing Sheets

System Block Diagram

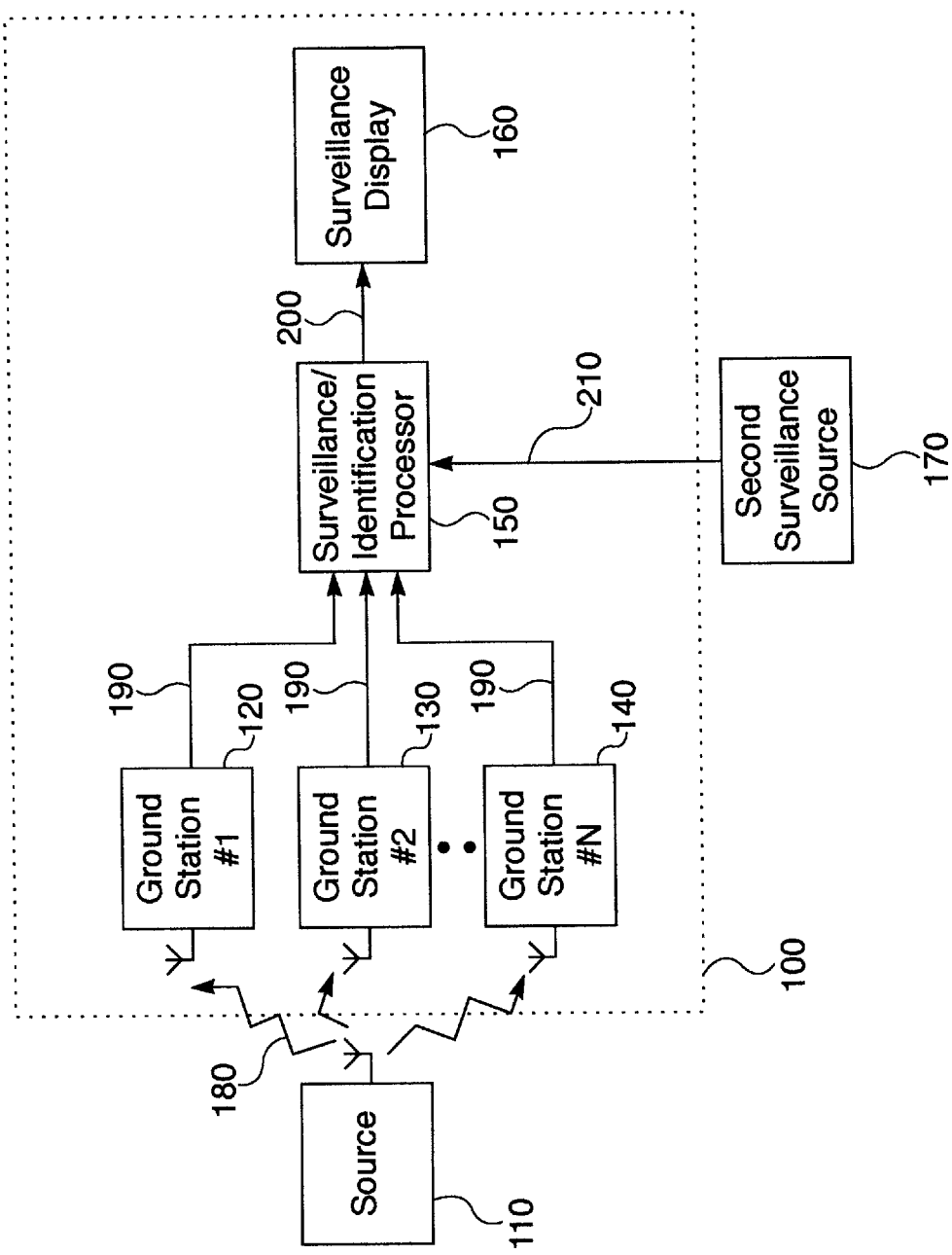
Figure 1: System Block Diagram

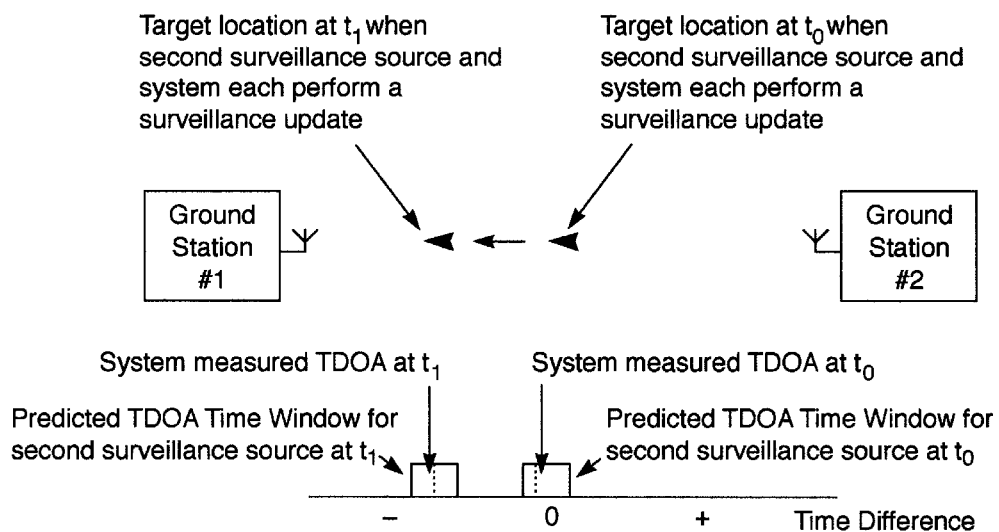
Figure 2: TDOA Correlation Illustration (Example 1)
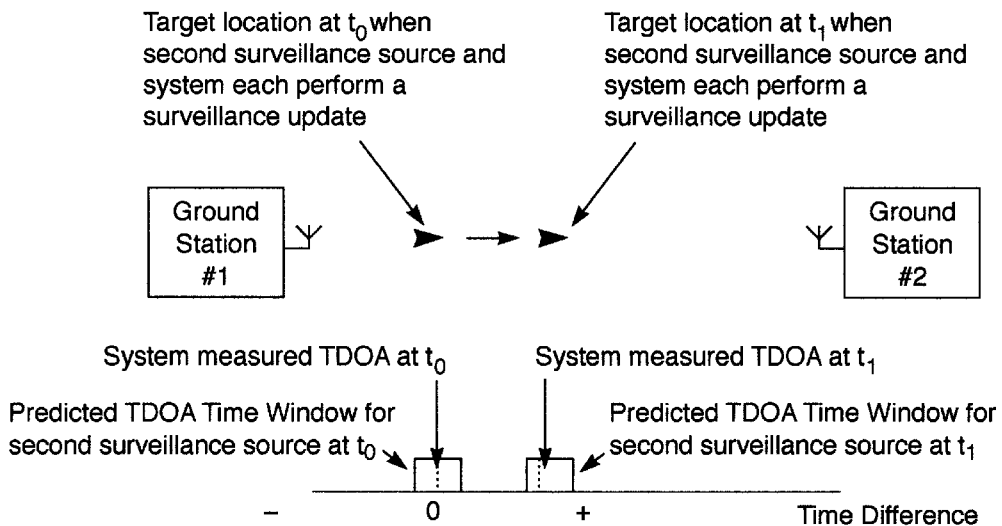
Figure 3: TDOA Correlation Illustration (Example 2)

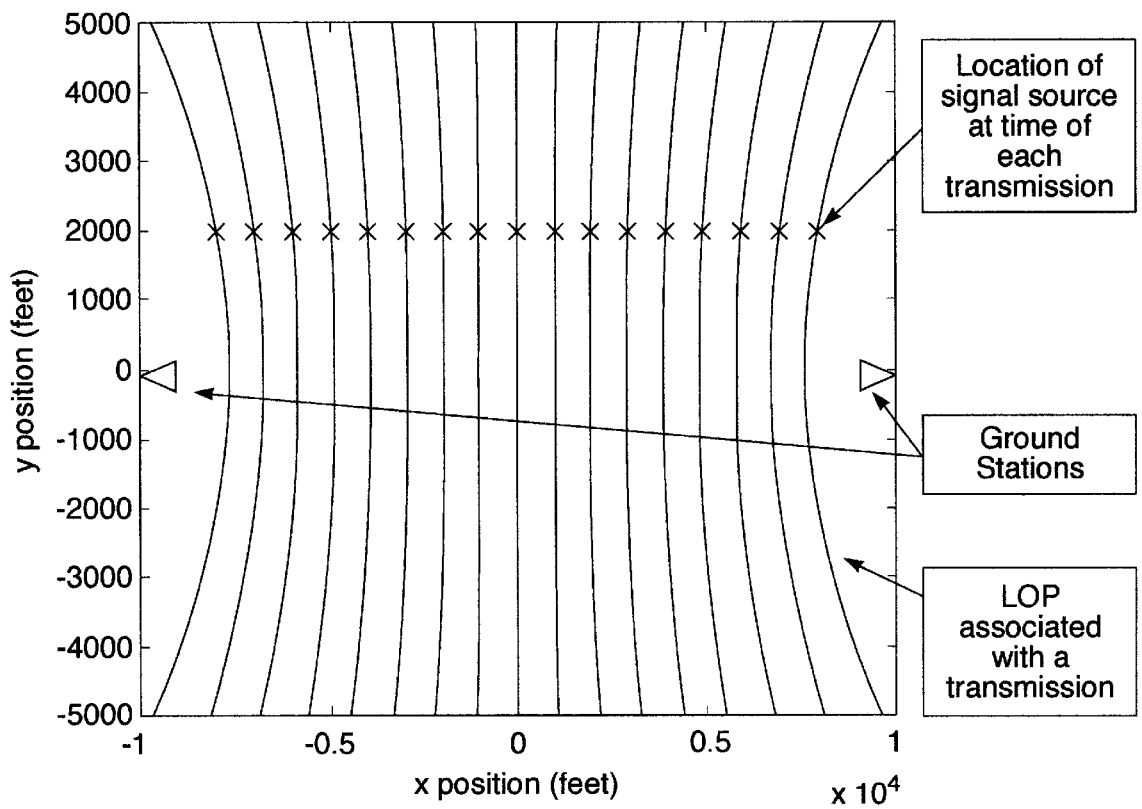
Figure 4: Line Of Position for a Moving Signal Source

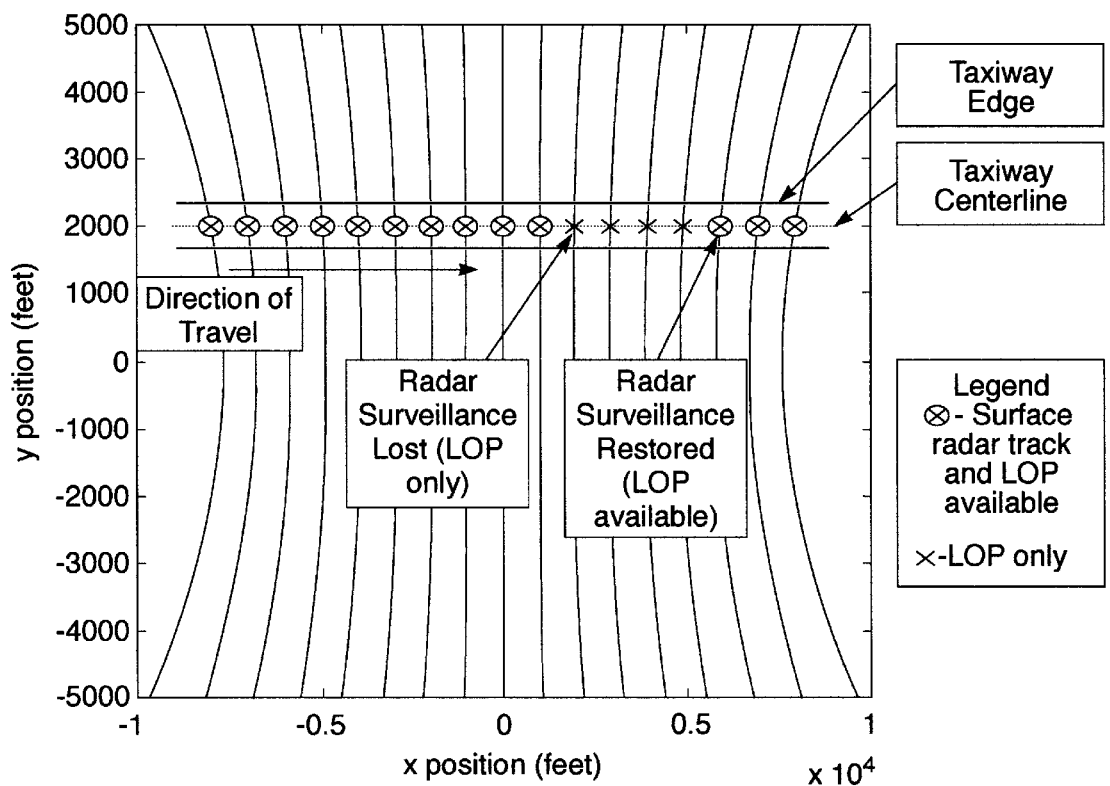
Figure 5: Position Aiding using Position Derived from the LOP Intersection with the Taxiway Centerline
SEQUENCE LISTING
Not applicable

METHOD AND APPARATUS FOR IMPROVING THE SURVEILLANCE COVERAGE AND TARGET IDENTIFICATION IN A RADAR BASED SURVEILLANCE SYSTEM

BACKGROUND OF THE INVENTION

This invention relates to surveillance systems. More specifically, the invention depicts a method and apparatus to supplement vehicle surveillance systems by providing vehicle identification and position aiding.

The Federal Aviation Administration (FAA) has installed Airport Surface Detection Equipment (ASDE) primary radar systems at the nations busiest airports. These radars provide a display in the Air Traffic Control (ATC) tower cab of runway/taxiway traffic movement. The display provides the tower controllers with enhanced situational awareness when visibility conditions make maintaining direct visual contact with traffic on the airport surface difficult. There are three key deficiencies associated with the ASDE primary radar: (1) surveillance coverage gaps result when radar installations do not have line-of-sight between the radar and the monitored traffic as is the case for complex airport layouts; (2) false targets are generated on the tower displays when multipath interference occurs and (3) primary radar cannot provide identification of aircraft with flight identification (ID).

In an effort to augment ASDE surveillance and resolve deficiencies, the FAA conducted trials of Aircraft Target Identification System (ATIDS) as described in an article titled "*Positive Identification of Aircraft on Airport Movement Area—Results of FAA Trials*" published in IEEE Aerospace and Electronic Systems Magazine, June 1996. ATIDS uses 1090 MHz multilateration to determine the location of Mode S and Mode A/C transponder equipped aircraft. Similar research using 1090 MHz multilateration is documented in "*Station Arrangement Effects on Ground-Referenced Aircraft Height Computation Based on Time Difference of Arrival*", published in Navigation: Journal of The Institute of Navigation, Vol. 42, No. 2, Summer 1995 and in "*The Czech Passive Surveillance System for Air Traffic Control*" published in the Journal of ATC, January–March 1997. The system also decodes aircraft transponder transmissions to determine each aircraft's 4096 code. ATIDS system elements in the ATC tower use the 4096 code to look up the flight ID available through an interface with Automated Radar Tracking System (ARTS). The FAA has demonstrated that the ATIDS position/Flight ID information can be fused with ASDE surveillance. However, one of the major limitations of ATIDS is that Mode S and Mode A/C transmissions are highly susceptible to multipath interference resulting from reflections off airport structures. Multipath interference results in corrupted 1090 MHz receptions at the ATIDS receive stations. Techniques have been developed to aid in the recovery of corrupted transmissions, for example, U.S. Pat. No. 5,528,244 describes a technique for recovering Mode S and Mode A/C transmissions that was tested in the ATIDS test trials. Even with the application of multipath mitigation techniques, reception performance can be significantly low in high multipath environments as was experienced in the ATIDS test trials. Multilateration using the Time Difference of Arrival (TDOA) technique requires reception from a minimum of 3 receivers to determine a 2D position as described in U.S. Pat. No. 5,191,342. To ensure a minimum of three receptions for each transponder transmission, diversity using more than three receivers is required to guarantee the surveillance update success rates required for the surface surveillance application. The cost of additional receivers beyond the minimum of 3 results in increased ATIDS system costs.

Accordingly, what is needed is a new method for performing multilateration that uses two receivers to provide identification of vehicles and provide a 2D position when reception is only available from two multilateration system receivers.

BRIEF SUMMARY OF THE INVENTION

This invention is an apparatus and method for supplementing vehicle surveillance systems by providing vehicle identification and position aiding. In an embodiment featuring a plurality of mobile radio transmitters and a plurality of ground stations, identification and position updates are provided when two of the ground station receive mobile transmissions. The ground stations time stamp each mobile transmission and decode the transmission identification code. Time stamp information is used to determine a TDOA measurement and a Line Of Position (LOP). The identification function is provided by correlating TDOA measurements expected TDOA from the surveillance sensor requiring target identification. The position aiding function is provided by using LOP, pavement area map, and track information to determine track updates for the surveillance system receiving the aiding.

BRIEF DESCRIPTION OF THE DRAWINGS

FIG. 1 is a block diagram of a system that performs identification and position determination of a signal source.

FIG. 2 is an illustration of correlating the system TDOA measurements with estimated TDOA from a second surveillance source (Example 1).

FIG. 3 is an illustration of correlating the system TDOA measurements with estimated TDOA from a second surveillance source (Example 2).

FIG. 4 is an illustration of Line Of Position for a moving signal source.

FIG. 5 is an illustration of position aiding using 2 dimensional position determined from the intersection Line Of Position with runway or taxiway centerline.

DETAILED DESCRIPTION OF THE INVENTION

The present invention is now described with reference to the figures where like reference numbers denote like elements/steps. In the preferred embodiment, 1090 MHz transmissions 180 from aircraft Mode S and Mode A/C transponders 110 are processed by the system 100, illustrated in FIG. 1, to provide aircraft identification and position aiding of surface radar 170 tracked targets 210.

The system 100 comprises two 120, 130 or more ground stations 140 and a surveillance/identification processor 150. Each ground station 120, 130, 140 receives, time stamps, and decodes each transponder transmission 180 to extract the binary Mode S and Mode A/C message data. Timers in each ground station 120, 130, 140 provide the source of timing information. All ground station timers are synchronized to each other. Each ground station 120, 130, 140 provides communications to send Mode S and Mode A/C message data and corresponding time stamp information 190 to a surveillance/identification processor 150. The surveillance/identification processor 150 processes Mode S and Mode A/C message data and time stamp information 190 to provide aircraft identification determination, and identification correlation to radar tracks, and position aiding. A surveillance display 160 provides the ATC with a display of vehicle position and identification 200.

Aircraft are identified to the air traffic controller by the Flight ID of the aircraft. Aircraft identification determination requires extracting the transponder 4096 codes from the Mode S and Mode A/C message data 190 and determining the corresponding call sign with each 4096 code. The 4096 code is contained in the Mode S and Mode A messages as defined in *Minimum Operational Performance Standards for Air Traffic Control Radar Beacon System/Mode Select (ATCRBS/MODE S) Airborne Equipment*, RTCA/DO-181A, January 1992. Flight plan data provides a list of 4096 codes and the associated Call Signs of aircraft that are currently operating in the National Airspace System. The surveillance/identification processor 150 obtains flight plan data via an interface with Automated Radar Tracking System. Once a transponder address 190 has been associated with a Call Sign, all subsequent transmissions from the transponder are identified as each transmission 180 contains an address 190.

The key feature of the invention is that the system uses transponder transmission receptions 180 from only two ground stations 120, 130 out of a plurality of ground station to provide identification correlation and perform position aiding of surface surveillance radar tracks. Identification correlation is provided by matching system measured Time Difference Of Arrival for transponder transmission(s) 180 with the expected TDOA(s) derived from radar track positions 210. The equation for determining system measured TDOA of the transponder source is defined as follows:

$$\Delta t_{transponder} = t_{station\ 1} - t_{station\ 2}$$

Where $t_{station\ 1}$—Transponder transmission time stamp 190 from station 1

$t_{station\ 2}$—Transponder transmission time stamp 190 from station 2

The equation for calculating expected TDOA of a radar track position 210 update is calculated as follows.

$$\Delta t_{radar} = t_{station\ 1\ expected} - t_{station\ 2\ expected}$$

Where $$t_{station\ 1\ expected} = \text{sqrt}\left((x_{radar} - x_{station\ 1})^2 + (y_{radar} - y_{station\ 1})^2 + (z_{radar} - z_{station\ 1})^2\right) * C$$

$$t_{station\ 2\ expected} = \text{sqrt}\left((x_{radar} - x_{station\ 2})^2 + (y_{radar} - y_{station\ 1})^2 + (z_{radar} - z_{station\ 2})^2\right) * C$$

and $x_{radar}$=radar track x position 210
$y_{radar}$=radar track y position 210
$z_{radar}$=radar track z position 210
$x_{station\ 1}$=Surveyed x coordinate of station 1
$y_{station\ 1}$=Surveyed y coordinate of station 1
$z_{station\ 1}$=Surveyed z coordinate of station 1
$x_{station\ 2}$=Surveyed x coordinate of station 2
$y_{station\ 2}$=Surveyed y coordinate of station 2
$z_{station\ 2}$=Surveyed z coordinate of station 2
C=speed of light Both the surface surveillance radar 170 and the ground stations 120, 130, 140 have a common Cartesian reference frame and origin. Correlation is established when a $\Delta t_{transponder}$ falls within $\Delta t_{radar}$ time window as illustrated in FIGS. 2 and 3. Radar position errors will result in estimation errors for the $\Delta t_{radar}$. Therefore, a time window centered on $\Delta t_{radar}$ is established to reflect the uncertainty in $\Delta t_{radar}$. Confidence in the correlation is established by correlating two or more consecutive $\Delta t_{radar}$ with $\Delta t_{transponder}$. The transponder transmission Flight ID is displayed on the ATC surface surveillance display 160 when a high correlation confidence is established. The displayed aircraft position is given a Call Sign tag to identify the aircraft.

The surveillance/identification processor 150 processes $\Delta t_{transponder}$ data for Mode S and Mode A transmissions 180 to calculate Line of Position when reception is only available from two ground stations 120, 130 and identification correlation has been successful. The LOP is used for position aiding in areas where the radar 170 has coverage gaps. LOP is a locust of points where a transponder equipped aircraft can be located as illustrated in FIG. 4 A Cartesian coordinate reference frame is established with the two ground stations 120, 130 lying on the x axis. The y axis bisects the x axis between the two ground station positions. LOP is defined by the hyperbolic equation:

$$\frac{y^2}{a^2} - \frac{x^2}{b^2} = 1$$

Where $a = \Delta t_{transponder}$ $b = \text{sqrt}(c^2 - a^2)$ and c=distance from origin to either ground station The surface radar surveillance track information is used to identify that an aircraft is on a specific runway or taxiway. After identification correlation between a radar track and a transponder's transmissions has been established, the aircraft's two dimensional position (x, y) is determined using LOP. LOP alone provides a locust of points on a hyperbolic line where the transponder can be located. However, the point of location on the LOP is determined from the intersection of the LOP with the centerline of the last known runway or taxiway of travel, as illustrated in FIG. 5. Last known runway or taxiway of travel is provided from surface radar track information. In the event that a radar track is dropped, the LOP derived position is used to locate aircraft.

The system 100 operates like previously fielded multilateration based airport surface surveillance systems in that it performs multilateration position determination when time stamped transponder transmissions 180 are received from three or more ground receive stations 120, 130, 140. Aircraft position is determined from the intersection at a single point of three or more LOPs where each ground station pair (e.g., 120 & 130, 120 & 140, 130 & 140) results in a LOP. Multilateration surveillance updates are correlated to the surface surveillance radar 170 track position updates 210 to provide track identification and position aiding.

While the invention has been particularly shown and described with reference to a preferred embodiment thereof, it will be understood by those skilled in the art that various changes in form and details may be made therein without betraying the spirit and scope of the invention as defined in the appended claims.

I claim:

1. A system for determining the line of position and identification of a minimum of one signal source, said system comprising:

(a) a plurality of at least two fixed ground stations, each containing a means for receiving the signal transmissions from the mobile signal source, the receiving means being located very precisely at known coordinates $(x_1,y_1,z_1)$ and $(x_2,y_2,z_2)$, means for measuring precisely time of arrival of the source signal transmissions, means to decode the address contained in a source signal transmission, and means for time synchronizing said ground stations;

(b) a data communications link for transmitting time of arrival and associated source signal address from each time of arrival measuring/signal decoding means to a central data processor;

(c) a surveillance/identification processor for computing time difference of arrival using the time of arrival and associated source signal address data received from the ground station means, computes line of position when a signal sources transmissions is received by two receiving means, computes 2 dimensional multilateration position (x, y) when a signal source transmission is received by three receiving means, computes 3 dimensional multilateration position (x,y,z) when a signal source transmission is received by a minimum of four receiving means, provides identification of targets detected by any second surveillance system by correlating system measured time difference of arrival/ source signal address to the second surveillance system target data, provides position aiding of any 2 dimensional and 3 dimensional position using system provided line of position from the source transmissions.

2. A method for determining the identification of any second surveillance system target track with unknown identification by correlating system measured time difference of arrival and associated source signal address to the second surveillance system determined track position, the method comprising the steps of:

(a) measuring the time of arrival of source signal transmissions received at two fixed ground station means;

(b) decoding the signal source identifying address data contained in each source transmission;

(c) computing the system measured time difference of arrival between the two time of arrivals measured for each source transmission;

(d) computing the predicted positions from position reports provided by a second surveillance system that correspond to the times that the system measured time difference of arrival were made;

(e) computing expected time difference of arrival s that correspond to the second surveillance source predicted position and the location of the system receiving means;

(f) defining an uncertainty window for each expected time difference of arrival;

(g) establishing correlation when a minimum of two system measured time difference of arrival s fall within a time uncertainty window;

(h) Assigning the source signal address associated with the correlated time difference of arrival s to the second surveillance system track number.

3. A method for computing a 2 dimensional position from line of position to provide position aiding when a second surveillance systems fails to update a minimum of one track position, the method comprising the steps of:

(a) performing correlation of system measured time difference of arrival for source transmissions to the second surveillance system measured position track of the source;

(b) measuring time of arrivals for a source signal transmission received at two ground station means;

(c) decoding the address data contained in the source transmission;

(d) computing the system measured time difference of arrival between the two time of arrivals measured for each source transmission;

(e) computing the line of position based on time difference of arrival measurements;

(f) correlating the source signal line of position to the second surveillance system position track by matching address associated to the line of position update to the identification of the track;

(g) determining the road that the track is on by matching the track position to a road in a map database;

(g) computing a 2 dimensional position update by determining where the line of position intersects the center of the road;

(h) computing the track smoothed position using the 2 dimensional position update.

* * * * *